United States Patent
Liu et al.

(10) Patent No.: US 10,072,884 B2
(45) Date of Patent: Sep. 11, 2018

(54) DEFROST OPERATIONS AND APPARATUS FOR A TRANSPORT REFRIGERATION SYSTEM

(75) Inventors: Lucy Yi Liu, Fayetteville, NY (US); Suresh Duraisamy, Liverpool, NY (US); Gilbert B. Hofsdal, Chittenango, NY (US)

(73) Assignee: CARRIER CORPORATION, Farmington, CT (US)

( * ) Notice: Subject to any disclaimer, the term of this patent is extended or adjusted under 35 U.S.C. 154(b) by 1101 days.

(21) Appl. No.: 13/576,222

(22) PCT Filed: Mar. 3, 2011

(86) PCT No.: PCT/US2011/026973
§ 371 (c)(1), (2), (4) Date: Jul. 31, 2012

(87) PCT Pub. No.: WO2011/112411
PCT Pub. Date: Sep. 15, 2011

(65) Prior Publication Data
US 2012/0318006 A1 Dec. 20, 2012

Related U.S. Application Data

(60) Provisional application No. 61/311,612, filed on Mar. 8, 2010.

(51) Int. Cl.
*F25B 49/02* (2006.01)
*F25B 41/04* (2006.01)
(Continued)

(52) U.S. Cl.
CPC ............ *F25B 49/02* (2013.01); *F25B 41/043* (2013.01); *F25D 21/08* (2013.01); *F25B 1/053* (2013.01);
(Continued)

(58) Field of Classification Search
CPC .... F25B 1/10; F25B 2400/13; F25B 2600/15; F25B 2341/0662
See application file for complete search history.

(56) References Cited

U.S. PATENT DOCUMENTS 1,782,651 A * 11/1930 Hoffman ................... F25B 5/02
62/198
3,464,225 A * 9/1969 Harnden, Jr. ......... F25B 49/022
236/88
(Continued)

FOREIGN PATENT DOCUMENTS

| CN | 1343297 A | 4/2002 |
| CN | 101512255 A | 8/2009 |

(Continued)

OTHER PUBLICATIONS

International Preliminary Report on Patentability.
International Search Report.

*Primary Examiner* — Ljiljana Ciric
*Assistant Examiner* — Alexis Cox
(74) *Attorney, Agent, or Firm* — Cantor Colburn LLP

(57) ABSTRACT

A method for operating a defrost mode of a transport refrigerant vapor compression system includes initiating a defrost operation for the transport refrigerant vapor compression system by energizing heaters operatively coupled to a heat absorption heat exchanger operable to defrost the heat absorption heat exchanger. During the defrost operation, the method includes comparing the heat absorption heat exchanger pressure to the first predetermined limit; in response to the heat absorption heat exchanger pressure being less than the first predetermined limit, performing at least one operation to determine if the defrost operation should be exited; and in response to the heat absorption heat
(Continued)

exchanger pressure being greater than the first predetermined limit, exiting the defrost operation.

9 Claims, 4 Drawing Sheets

(51) Int. Cl.
  *F25D 21/08* (2006.01)
  *F25B 1/053* (2006.01)
  *F25B 1/10* (2006.01)
  *F25B 9/00* (2006.01)

(52) U.S. Cl.
  CPC ............... *F25B 1/10* (2013.01); *F25B 9/008* (2013.01); *F25B 2309/061* (2013.01); *F25B 2341/0662* (2013.01); *F25B 2400/13* (2013.01); *F25B 2400/23* (2013.01); *F25B 2600/0253* (2013.01); *F25B 2600/2509* (2013.01); *F25B 2600/2513* (2013.01); *F25B 2700/197* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21161* (2013.01); *F25B 2700/21175* (2013.01); *Y02B 30/741* (2013.01)

(56) References Cited

U.S. PATENT DOCUMENTS

| | | | |
|---|---|---|---|
| 4,104,888 A | | 8/1978 | Reedy et al. |
| 4,385,502 A | * | 5/1983 | Denny ............... F25D 21/002 200/38 R |
| 4,407,138 A | * | 10/1983 | Mueller ............... F25D 21/006 62/126 |
| 4,760,707 A | | 8/1988 | Dennis et al. |
| 5,038,575 A | * | 8/1991 | Yamada ............... F25D 21/008 62/128 |
| 5,152,152 A | | 10/1992 | Brickner et al. |
| 5,259,198 A | | 11/1993 | Viegas et al. |
| 5,623,836 A | * | 4/1997 | Mrozinsky ......... G05D 23/1917 62/151 |
| 5,628,199 A | * | 5/1997 | Hoglund ............... F25B 49/02 62/127 |
| 6,574,978 B2 | | 6/2003 | Flynn et al. |
| 7,065,979 B2 | | 6/2006 | Arshansky et al. |
| 7,891,201 B1 | * | 2/2011 | Bush et al. .................. 62/115 |
| 8,522,564 B2 | * | 9/2013 | Koppineedi ............... F25B 1/04 62/113 |
| 2002/0069654 A1 | * | 6/2002 | Doi ........................... F25B 1/10 62/199 |
| 2003/0055603 A1 | * | 3/2003 | Rossi ................... F24F 11/0086 702/185 |
| 2003/0140644 A1 | | 7/2003 | Wightman |
| 2004/0148956 A1 | * | 8/2004 | Arshansky ............... F25B 9/008 62/335 |
| 2006/0042282 A1 | | 3/2006 | Ludwig et al. |
| 2006/0080989 A1 | * | 4/2006 | Aoki ....................... F25B 40/00 62/324.4 |
| 2006/0277931 A1 | * | 12/2006 | Nakamura ............ F04C 27/005 62/196.1 |
| 2007/0089436 A1 | | 4/2007 | Singh et al. |
| 2008/0022706 A1 | * | 1/2008 | Sakimichi ................. F25B 1/10 62/190 |
| 2008/0223055 A1 | * | 9/2008 | Choi ........................ F25B 1/10 62/193 |
| 2008/0289354 A1 | * | 11/2008 | Dudley .................... F25B 5/02 62/335 |
| 2009/0037143 A1 | | 2/2009 | Saunders |
| 2009/0120108 A1 | | 5/2009 | Heinbokel et al. |
| 2009/0205354 A1 | * | 8/2009 | Brown ................... F24F 3/1405 62/324.5 |
| 2010/0011793 A1 | | 1/2010 | Tiranno et al. |
| 2010/0115975 A1 | * | 5/2010 | Mitra ...................... F25B 1/10 62/196.1 |
| 2011/0138825 A1 | * | 6/2011 | Chen ....................... F25B 1/10 62/115 |
| 2011/0162397 A1 | * | 7/2011 | Huff ........................ F25B 1/10 62/115 |
| 2012/0011866 A1 | * | 1/2012 | Scarcella .................. F25B 1/10 62/79 |
| 2012/0055185 A1 | * | 3/2012 | Luo ......................... F25B 6/02 62/222 |
| 2012/0101673 A1 | * | 4/2012 | Caddick ................ B60H 1/004 701/22 |
| 2012/0192579 A1 | * | 8/2012 | Huff ..................... B60H 1/3232 62/115 |
| 2012/0227427 A1 | * | 9/2012 | Liu .......................... F25B 1/10 62/115 |
| 2012/0318008 A1 | * | 12/2012 | Liu ........................ F25B 9/008 62/115 |
| 2012/0318014 A1 | * | 12/2012 | Huff ........................ F25B 1/10 62/228.1 |
| 2013/0031934 A1 | * | 2/2013 | Huff ........................ F25B 1/10 62/510 |
| 2013/0255289 A1 | * | 10/2013 | Jung ...................... F25B 43/00 62/115 |

FOREIGN PATENT DOCUMENTS

| | | | |
|---|---|---|---|
| GB | 1239187 A | * 7/1971 | ............... F25B 5/02 |
| WO | 2008140454 | 11/2008 | |

* cited by examiner

DEFROST OPERATIONS AND APPARATUS FOR A TRANSPORT REFRIGERATION SYSTEM

CROSS-REFERENCE TO RELATED APPLICATION

This application claims priority to U.S. Provisional Patent Application Ser. No. 61/311,612 entitled "Defrost Operations and Apparatus for a Transport Refrigeration System" filed on Mar. 8, 2010, the content of which is incorporated herein by reference in its entirety.

FIELD OF THE INVENTION

This disclosure relates generally to refrigeration systems and, more specifically, to methods and apparatus for controlling a refrigerant vapor compression system.

BACKGROUND OF THE INVENTION

Conventional vapor compression systems typically include a compressor, a heat rejection heat exchanger, a heat absorption heat exchanger, and an expansion device disposed upstream of the heat absorption heat exchanger. Some systems further include a second expansion device downstream of the heat rejection heat exchanger, such as a suction modulation valve. These basic system components are interconnected by working fluid lines in a closed circuit.

Depending upon the characteristics of the working fluid in use in a particular application, a vapor compression system may be operated in either a subcritical mode or a transcritical mode. In vapor compression systems operating in a subcritical cycle, both the vapor heat rejection heat exchanger and the heat absorption heat exchanger operate at pressures below the critical pressure of the working fluid. Thus, in the subcritical mode, the vapor heat rejection heat exchanger functions as a working fluid condenser and the heat absorption heat exchanger functions as a working fluid evaporator.

However, in refrigerant vapor compression systems operating in a transcritical cycle, the vapor heat rejection heat exchanger operates at a refrigerant temperature and pressure in excess of the refrigerant's critical pressure, while the heat absorption heat exchanger operates at a refrigerant temperature and pressure in the subcritical range. Thus, in the transcritical mode, the vapor heat rejection heat exchanger functions as a working fluid gas cooler and the heat absorption heat exchanger functions an as a working fluid evaporator.

In vapor compression systems used in refrigeration applications, commonly referred to as refrigerant vapor compression systems, the working fluid is refrigerant. Refrigerant vapor compression systems charged with conventional refrigerants, such as for example, fluorocarbon refrigerants such as, but not limited to, hydro chlorofluorocarbons (HCFCs), such as R22, and more commonly hydro fluorocarbons (HFCs), such as R134a, R404A, and R407C, typically operate in the subcritical mode. "Natural" refrigerants, such as carbon dioxide, are also used in refrigerant vapor compression systems instead of HCFC or HFC refrigerants. Because carbon dioxide has a low critical temperature, most refrigerant vapor compression systems charged with carbon dioxide as the refrigerant are designed for operation in the transcritical mode.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, i.e., an idle state.

SUMMARY OF THE INVENTION

According to one aspect, the present disclosure can provide refrigerant vapor compression systems and methods that can control defrost operations. Embodiments according to the disclosure can use selected control of a refrigerant vapor compression system or components thereof to improve compressor reliability, reduce trapped refrigerant or reduce relief valve set off. Embodiments according to the disclosure can address defrost operations to allow refrigerant flow within selected portions of the internal volume of the system. Embodiments according to the disclosure can address defrost operations to monitor pressure.

In one embodiment, a method for operating a defrost mode of a high pressure refrigerant vapor compression system, the primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger; and a secondary expansion device disposed in the refrigerant circuit downstream of said refrigerant heat rejection heat exchanger and upstream of a refrigerant reservoir upstream of the refrigerant heat absorption heat exchanger; the primary refrigerant circuit having a high-pressure side upstream with respect to refrigerant flow of the primary expansion device and a low-pressure side downstream with respect to refrigerant flow of the primary expansion device; the method can include closing a third expansion valve downstream of the heat absorption heat exchanger; slightly opening the primary expansion device; opening the second expansion valve to a substantially open position; initiating a defrost mode for the refrigerant vapor compression system; comparing a heat absorption heat exchanger pressure to a first predetermined limit, where the first predetermined limit is less than a pressure release valve prescribed pressure; energizing heaters corresponding to the heat absorption heat exchanger operable to defrost the heat absorption heat exchanger; and determining completion of a defrost operation of the heat absorption heat exchanger.

In one embodiment, a method for operating a defrost mode of a high pressure refrigerant vapor compression system, the primary refrigerant circuit including a refrigerant compression device, a refrigerant heat rejection heat exchanger downstream of said compression device, a refrigerant heat absorption heat exchanger downstream of said refrigerant heat rejection heat exchanger, a primary expansion device disposed in the refrigerant circuit downstream of said refrigerant heat rejection heat exchanger and upstream of said refrigerant heat absorption heat exchanger; and suction modulation valve operatively coupled downstream of said refrigerant heat absorption heat exchanger and upstream of said refrigerant compression device; the method can include closing the suction modulation valve; slightly opening the primary expansion device valve; initiating a defrost mode for the refrigerant vapor compression system; comparing an heat absorption heat exchanger pressure to a first predetermined limit, where the predetermined limit is less than a pressure release valve prescribed pressure; energizing heaters corresponding to the heat absorption heat exchanger operable to defrost the heat absorption heat exchanger; and determining first completion of a defrost operation of the heat absorption heat exchanger or a second completion of the defrost operation when the heat absorption heat exchanger pressure is greater than the first predetermined limit.

In yet another embodiment, a refrigerant vapor compression system can include a compressor to compress a refrigerant, the compressor having an inlet port and a discharge port; a refrigerant heat rejection heat exchanger operatively coupled downstream to the discharge port of the compressor; a refrigerant heat absorption heat exchanger operatively coupled downstream to the refrigerant heat rejection heat exchanger; a primary flow control device disposed in the refrigerant circuit downstream of said refrigerant heat rejection heat exchanger and upstream of said refrigerant heat absorption heat exchanger; a refrigerant reservoir between the heat rejection heat exchanger and the heat absorption heat exchanger; a secondary flow control device disposed in the refrigerant circuit downstream of said refrigerant heat rejection heat exchanger and upstream of said refrigerant reservoir; a compressor inlet line connecting the refrigerant heat absorption heat exchanger to the inlet port of the compressor; a third expansion device operatively coupled to the inlet line; a sensor operatively coupled to the refrigerant heat absorption heat exchanger to measure a condition of the refrigerant heat absorption heat exchanger; and a controller in communication with the sensor, the controller configured to operate the refrigerant vapor compression system in a first mode and a second mode, wherein in the second mode the controller is operative to set the primary flow control device to a near closed setting, set the second flow control device to a substantially open setting and set the third flow control device to a closed setting.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF THE INVENTION

Figure 1:
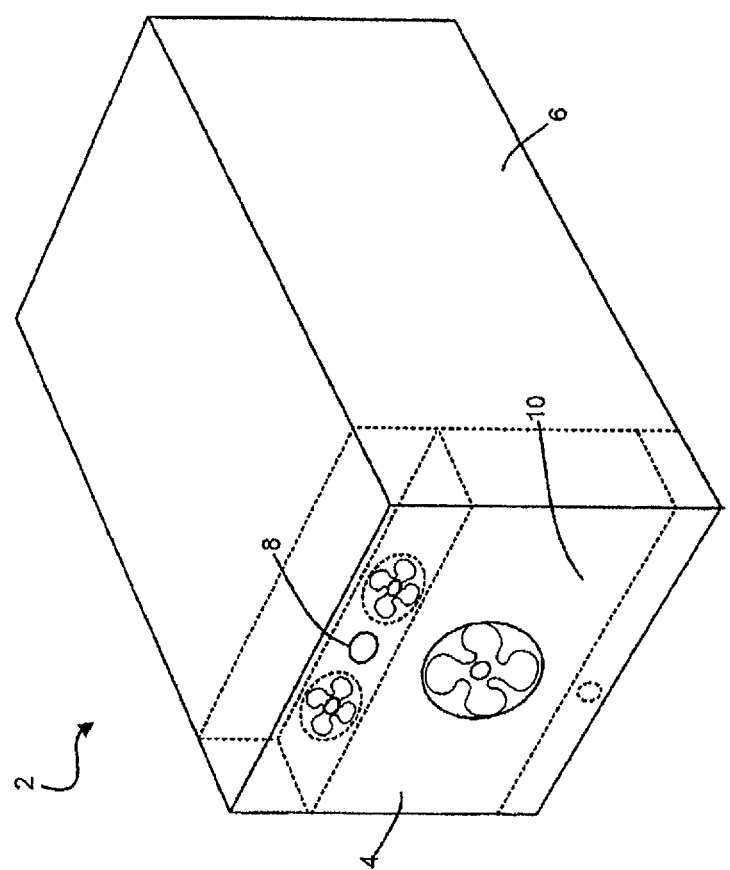
FIG. 1 schematically illustrates an embodiment of a refrigerant vapor compression system according to the application.

Referring to FIG. 1, a refrigerant vapor compression system 2 may include a transport refrigeration unit 4 coupled to an enclosed space within a container 6. The container 6 may be a temperature controlled environment, such as a cargo box of a refrigerated transport truck, trailer or container, or a display case, merchandiser, freezer cabinet, cold room or other perishable/frozen product storage area in a commercial establishment, or a climate controlled comfort zone within a residence, office building, hospital, school, restaurant or other facility. In the disclosed example, the refrigerant vapor compression system 2 is of the type utilized on refrigerated transport truck. As shown in FIG. 1, the transport refrigeration unit 4 is configured to maintain a programmed thermal environment within the container 6.

In FIG. 1, the transport refrigeration unit 4 is mounted at one end of the container 6. However, the transport refrigeration unit 4 may also be mounted to one or more sides of the container 6. In one embodiment, a plurality of transport refrigeration units 4 may be mounted to a single container 6. Alternatively, a single transport refrigeration unit 4 may be mounted to a plurality of containers 6 or multiple enclosed spaces within a single container. The transport refrigeration unit 4 typically operates to intake air at a first temperature and to exhaust air at a second temperature. In one embodiment, the exhaust air from the transport refrigeration unit 4 will be warmer than the intake air such that the transport refrigeration unit 4 is utilized to warm the air in the container 6. In another embodiment, the exhaust air from the transport refrigeration unit 4 will be cooler than the intake air such that the transport refrigeration unit 4 is utilized to cool the air in the container 6.

In one embodiment, the transport refrigeration unit 4 may include one or more temperature sensors to continuously or repeatedly monitor the return air temperature and/or the supply air temperature. As shown in FIG. 1, a supply air temperature sensor (STS) 8 of the transport refrigeration unit 4 may provide the supply temperature and a return air temperature sensor (RTS) 10 of the transport refrigeration unit 4 may provide the return temperature to the transport refrigeration unit 4, respectively. Alternatively, the supply temperature and the return temperature may be determined using remote sensors.

A refrigerant vapor compression system 2 may provide air with controlled temperature, humidity or/and species concentration into an enclosed chamber where cargo is stored such as in container 6. The refrigerant vapor compression system 2 is capable of controlling a plurality of the environmental parameters or all the environmental parameters within corresponding ranges with a great deal of variety of cargos and under all types of ambient conditions.

Figure 2:
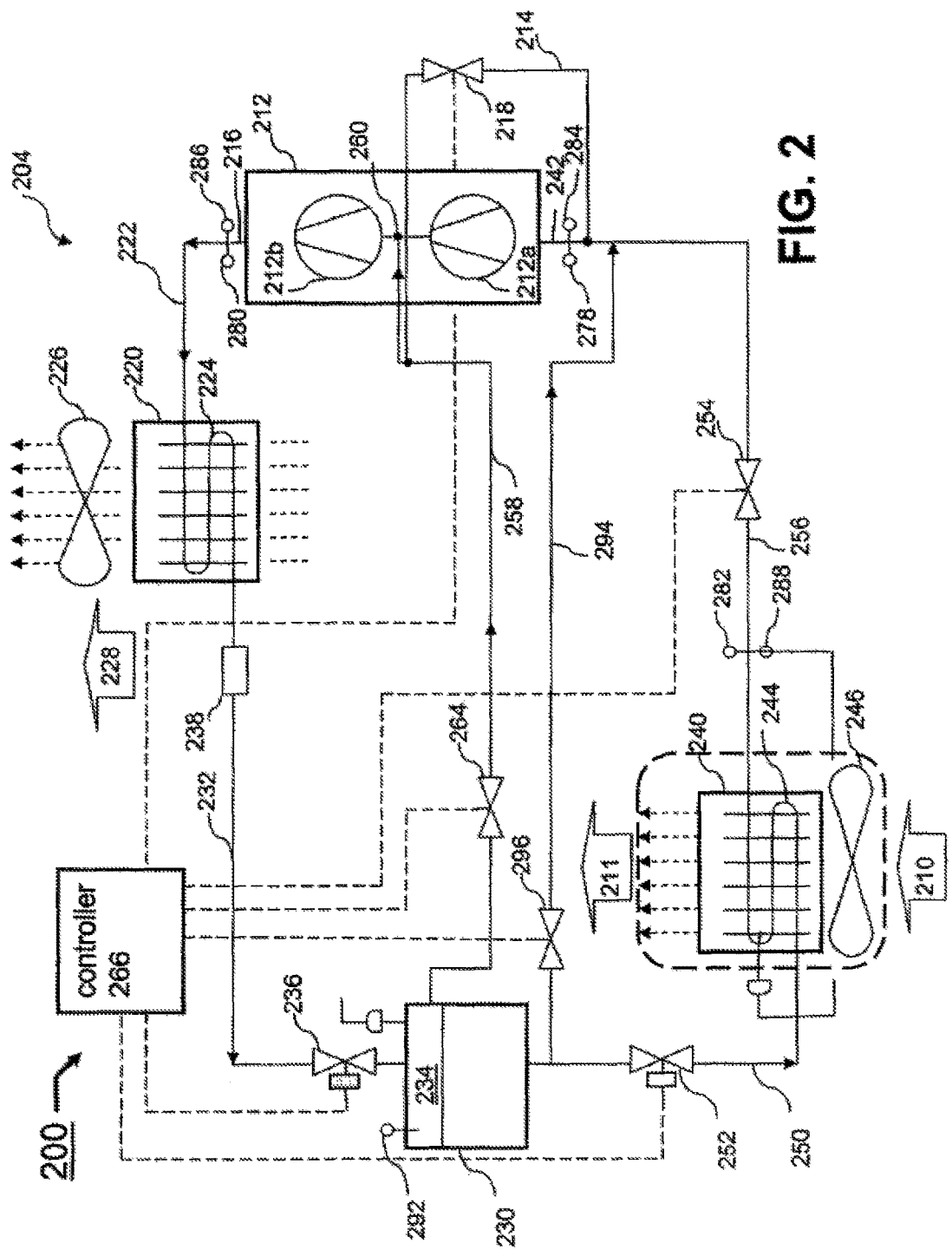
FIG. 2 schematically illustrates an exemplary embodiment of the transport refrigeration unit of FIG. 1.

Referring to FIG. 2 of the drawings, an exemplary embodiment of a refrigerant vapor compression system 200 designed for operation with a high pressure refrigerant in a transcritical cycle with a low critical point refrigerant is shown. The low critical point refrigerant may be carbon dioxide and refrigerant mixtures containing carbon dioxide, for example. However, it is to be understood that the refrigerant vapor compression system 200 may also be operated in a subcritical cycle with a higher critical point refrigerant such as conventional hydro chlorofluorocarbon and hydro fluorocarbon refrigerants.

The refrigerant vapor compression system 200 is particularly suitable for use in a transport refrigeration system for refrigerating the air or other gaseous atmosphere within the temperature controlled enclosed volume such as a cargo space of a truck, trailer, container, or the like for transporting perishable/frozen goods. The refrigerant vapor compression system 200 is also suitable for use in conditioning air to be supplied to a climate controlled comfort zone within a residence, office building, hospital, school, restaurant, or other facility. The refrigerant vapor compression system 200 could also be employed in refrigerating air supplied to display cases, merchandisers, freezer cabinets, cold rooms or other perishable/frozen product storage areas in commercial establishments.

The refrigerant vapor compression system 200 can include a multi-stage compressor 212, wherein the refrigerant is compressed to a higher temperature and pressure. The compressor 212 may be powered by single phase electric power, three phase electrical power, and/or a diesel engine and can, for example, operate at a constant speed or operate with a variable frequency drive. The compressor 212 may be a scroll compressor, a rotary compressor, a reciprocal compressor, or the like. The transport refrigeration unit 204 requires electrical power from, and can be connected to, a power supply unit (not shown) such as a standard commercial power service, an external power generation system such as that found shipboard, a diesel generator, or the like.

In the illustrated embodiment, the compressor 212 is a single multiple stage refrigerant compressor, for example a compressor disposed in the primary refrigerant circuit and having a first compression stage 212a and a second compression stage 212b. The first and second compression stages are disposed in series refrigerant flow relationship, with the refrigerant leaving the first compression stage 212a passing directly to the second compression stage 212b for further compression. Alternatively, the compressor 212 may comprise a pair of independent compressors 212a and 212b, connected in series refrigerant flow relationship in the primary refrigerant circuit via a refrigerant line connecting the discharge outlet port of the first compressor 212a in refrigerant flow communication with an inlet port (e.g., the suction inlet port) of the second compressor 212b. In the independent compressor embodiment, the compressors 212a and 212b may be reciprocating compressors, rotary compressors, or any other type of compressor or a combination of any such compressors. In the embodiment depicted in FIG. 2, the refrigerant vapor compression system 200 includes a bypass line 214 providing a refrigerant flow passage from an intermediate port 260 of the compressor 212 back to the suction side of the compressor. An unload valve 218 disposed in the bypass line 214 may be selectively positioned in an open position in which refrigerant flow passes through the bypass line 214 and a closed position in which refrigerant flow through the bypass line 214 is partially restricted or shut off.

The refrigerant vapor compression system 200 further includes a refrigerant heat rejection heat exchanger 220 operatively coupled to the discharge port 216 of the compressor 212 along a compressor discharge line 222. In a refrigerant vapor compression system operating in a transcritical cycle, such as systems utilizing carbon dioxide refrigerants, for example, the refrigerant heat rejection heat exchanger 220 is commonly referred to as a gas cooler. The supercritical refrigerant (gas) passes in heat exchange relationship with a cooling medium such as ambient gas or liquid (e.g., air or water), for example. In a refrigerant vapor compression system operating in a subcritical cycle, such as systems utilizing fluorocarbon refrigerants for example, the refrigerant heat rejection heat exchanger 220 is commonly referred to as a condenser. The condenser may include a refrigerant condensing heat exchanger through which hot, high pressure refrigerant vapor passes in heat exchange relationship with the cooling medium and is condensed to a liquid.

The refrigerant heat rejection heat exchanger 220 may comprise a finned-tube heat exchanger, such as a fin and round tube heat exchange coil or a fin and mini-channel flat tube heat exchanger, for example. Refrigerant passes through serpentine tubes 224 in heat exchange relationship with ambient air being drawn through the heat exchanger 220 by one or more fans 226. The air stream from the fan 226 allows heat to be removed from the refrigerant circulating within the refrigerant heat rejection heat exchanger 220. An ambient air temperature sensor (AAT) 228 may be positioned upstream of the fan 226 to sense the ambient air temperature.

The refrigerant vapor compression system 200 may include a refrigerant reservoir or receiver 230 operatively disposed downstream of the refrigerant heat rejection heat exchanger 220 along a condenser discharge line 232 to provide storage for excess liquid refrigerant (e.g., low temperature operation). In one example, the receiver 230 is a flash tank receiver having a separation chamber 234 where refrigerant in the liquid state collects in a lower portion of the separation chamber and refrigerant in the vapor state collects in the portion of the separation chamber above the liquid refrigerant. In the example, the refrigerant is carbon dioxide ($CO_2$). As the $CO_2$ refrigerant leaves the refrigerant heat rejection heat exchanger 220, it passes through an auxiliary expansion valve 236. The auxiliary expansion valve 236 may be a variable control valve selectively positionable so as to expand the refrigerant to a lower pressure so it enters the flash tank receiver 230 as a mixture of liquid refrigerant and vapor. The flash tank receiver 230 operates as a charge control tank. The liquid refrigerant settles in the lower portion of the flash tank receiver 230 and the refrigerant vapor collects in the upper portion. A filter drier 238 may be disposed downstream of the heat rejection heat exchanger 220 along a refrigerant liquid line 232 to keep the refrigerant clean and dry.

In another embodiment, the receiver 230 may include a water-cooled condenser and associated plumbing (not shown).

Whether the refrigerant vapor compression system 200 is operating in a transcritical cycle or a subcritical cycle, the system further includes a refrigerant heat absorption heat exchanger 240, also referred to herein as an evaporator, operatively coupled between the refrigerant heat rejection heat exchanger 220 and a suction port 242 of the compressor 212. In the refrigerant heat absorption heat exchanger 240, refrigerant liquid or a mixture of refrigerant liquid and vapor is passed in heat exchange relationship with a fluid to be cooled, most commonly air, drawn from and returned to the container 6. In one example, the refrigerant heat absorption heat exchanger 240 comprises a finned tube heat exchanger 244 through which refrigerant passes in heat exchange relationship with air drawn from and returned to the refrigerated container 6 by one or more evaporator or heat absorption heat exchanger fans 246. The finned tube heat exchanger 244 may comprise, for example, a fin and round tube heat exchange coil or a fin and mini-channel flat tube heat exchanger. The heat absorption heat exchanger fan 246 may be located and ducted so as to circulate the air contained within the container 6. In one embodiment, the heat absorption heat exchanger fan 246 directs the stream of air across the surface of the finned tube heat exchanger 244, thereby removing heat from the air, and the reduced temperature air is then circulated within the enclosed volume of the container 6 to lower the temperature of the enclosed volume.

A primary expansion device may be connected along an evaporator inlet line 250 between an output of the refrigerant heat rejection heat exchanger 220 and an input of the refrigerant heat absorption heat exchanger 240. In the disclosed embodiment, the primary expansion device is an electronic expansion valve 252 or EVXV 252 to meter the refrigerant flow so as to maintain a desired level of superheat in the refrigerant vapor leaving the heat absorption heat exchanger 240. The expansion valve 252 can be an adiabatic expansion valve and help to ensure that no liquid is present in the refrigerant leaving the heat absorption heat exchanger 240. The low pressure refrigerant vapor leaving the heat absorption heat exchanger 240 returns to the suction port 242 of the first compression stage or first compressor 212*a*.

In one embodiment, the refrigerant vapor compression system 2 further includes a suction modulation valve 254. In the illustrated example, the suction modulation valve 254 is positioned along a suction inlet line 256 between the outlet of the refrigerant heat absorption heat exchanger 240 and the tee for the compressor unload bypass line 214. The suction modulation valve 254 can be an adiabatic expansion device and be used for capacity modulation. The suction modulation valve 254 may comprise a pulse width modulated solenoid valve in one example.

Additionally, the refrigerant vapor compression system 2 may include an economizer circuit establishing refrigerant vapor flow along an injection line 258 between the receiver 230 and an intermediate inlet port 260 of the compressor 212. The economizer circuit includes an economizer solenoid valve 264 to control the refrigerant flow between the receiver 230 and a compressor economize port. In the illustrated embodiment, the economizer solenoid valve 264 is disposed in operative association with and downstream of the receiver 230. The economizer solenoid valve 264 may be a high pressure electronic expansion valve or a solenoid valve, for example. The vapor injection line 258 connects the upper portion of the separation chamber 234 of the flash tank receiver 230 to the intermediate inlet port 260 of the compressor 212.

The refrigerant vapor compression system 2 also includes a control system operatively associated therewith for controlling operation of the refrigerant vapor compression system. The control system can include a controller 266 that can determine the desired mode of operation in which to operate the refrigerant vapor compression system 2 based upon consideration of refrigeration load requirements, ambient conditions and various sensed system operating parameters. In the disclosed embodiment, the controller 266 can include a microprocessor.

Among the specific sensors and transducers monitored by the controller 266 are the return air temperature sensor (RAT) 210 and supply air temperature sensor (SAT) 211 that can input values according to the evaporator return air temperature; and the supply air temperature, respectively; the ambient air temperature (AAT) sensor 228 can input a value according to the ambient air temperature read in front of the refrigerant heat rejection heat exchanger 220; a compressor suction temperature (CST) sensor 278; that can input a variable resistor value according to the compressor suction temperature; a compressor discharge temperature (CDT) sensor 280, that can input a value according to the compressor discharge temperature inside the dome of the compressor 212; an evaporator outlet temperature (EVOT) sensor 282, that can input a value according to the outlet temperature of the refrigerant heat absorption heat exchanger 240; the compressor suction pressure (CSP) transducer 284, that can input a value or voltage according to the compressor suction value of the compressor 212; the compressor discharge pressure (CDP) transducer 286, that can input a voltage according to the compressor discharge value of the compressor 212; the evaporator outlet pressure (EVOP) transducer 288 that can input a voltage according to the outlet pressure of the refrigerant heat absorption heat exchanger 240; and/or additional sensors used by the system 2.

The controller 266 may also control the positioning of the auxiliary expansion valve 236, the economizer solenoid valve 264, and/or the liquid injection flow control device 296. The controller 266 may position the auxiliary expansion valve 236 responsive to temperature and pressure measurements at the exit of the refrigerant heat rejection heat exchanger 220. The controller 266 may also control the positioning of the economizer solenoid valve 264 to selectively permit refrigerant vapor to pass from the receiver 230 through the injection line 258 for admittance into the intermediate inlet port 260 of the compressor 212. Similarly, the controller 266 may also position the liquid injection flow control device 296 in an open position for selectively permitting refrigerant liquid to pass from the receiver 230 through the liquid injection line 294 for injection into the suction port 242 of the compressor 212.

In the embodiment depicted in FIG. 2, the refrigerant vapor compression system 2 may further include a refrigerant liquid injection line 294. The refrigerant liquid injection line 294 can tap into the refrigerant liquid line 250 at a location downstream of the receiver 230 and upstream of the expansion valve 252 and open into the suction port 242 of the compressor 212. A liquid injection flow control device 296 may be disposed in the liquid injection line 294. The liquid injection flow control device 296 may comprise a flow control valve selectively positionable between an open position, wherein refrigerant liquid flow may pass through the liquid injection line 294, and a closed position wherein refrigerant liquid flow through the refrigerant liquid injection line 294 is reduced or blocked. In an embodiment, the liquid injection flow control device 296 comprises a two-position solenoid valve of the type selectively positionable between a first open position and a second closed position.

In the exemplary embodiment of the refrigerant vapor compression system 2 depicted in FIG. 2, injection of refrigerant vapor into the intermediate inlet port 260 of the compressor 212 would be accomplished by injection of the refrigerant vapor (e.g., injection line 258) into the refrigerant passing from the first compression stage 212*a* into the second compression stage 212*b* of the compressor 212.

The controller 266 may also control the positioning of the auxiliary expansion valve 236, the economizer solenoid valve 264, and/or the liquid injection flow control device 296. The controller 266 may position the auxiliary expansion valve 236 responsive to temperature and pressure measurements at the exit of the refrigerant heat rejection heat exchanger 220. The controller 266 may also control the positioning of the economizer solenoid valve 264 to selectively permit refrigerant vapor to pass from the economizer device 262 through the injection line 258 for admittance into the intermediate inlet port 260 of the compressor 212. Similarly, the controller 266 may also position the liquid injection flow control device 296 in an open position for selectively permitting refrigerant liquid to pass from the receiver 230 through the liquid injection line 294 for injection into the suction port 242 of the compressor 212.

Figure 3:
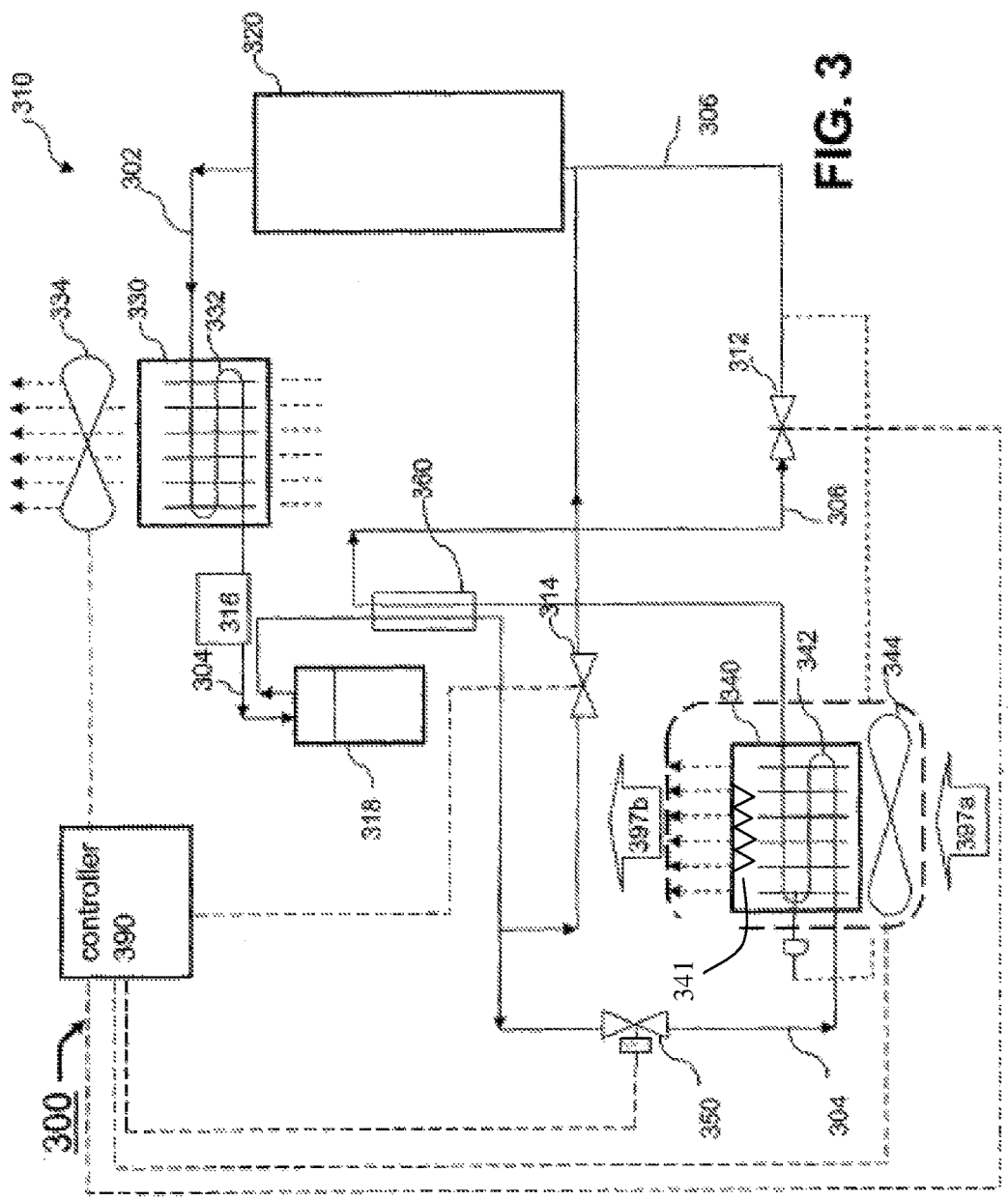
FIG. 3 schematically illustrates an exemplary embodiment of the transport refrigeration unit of FIG. 1.

FIG. 3 is a diagram that illustrates an exemplary embodiment of the transport refrigeration unit of FIG. 1. As shown in FIG. 3, an exemplary embodiment of a transport refrigeration system 300 can include a compressor 320, a heat rejection heat exchanger 330 including a coil 332 and associated fan(s) 334, a heat absorption heat exchanger 340 including a coil 342 and associated fan(s) 344, and an evaporator thermal expansion valve (TXV) 350 connected in a conventional manner by refrigerant lines 302, 304 and 306 in a refrigerant flow circuit. The compressor 320 can be a reciprocating compressor or a scroll compressor, single-stage or two-stage; however, the particular type of compressor used herein is not intended to or limiting.

Refrigerant line 302 connects the discharge outlet of the compressor 320 in refrigerant flow communication with the inlet to the heat rejection heat exchanger coil 332, refrigerant line 304 connects the outlet of the coil 332 in refrigerant flow communication with the inlet to the heat absorption heat exchanger coil 342, and refrigerant line 306 connects the outlet of the coil 342 in refrigerant flow communication with the suction inlet of the compressor 320, thereby completing the refrigerant flow circuit. As depicted in the exemplary embodiments illustrated in FIG. 3, a refrigerant-to-refrigerant in-line heat exchanger 360 may be included in the refrigerant flow circuit for passing the liquid refrigerant passing through refrigerant line 304 in heat exchange relationship with the vapor refrigerant passing through refrigerant line 306. In addition, a suction modulation valve 312, a quench expansion valve 314, a filter/drier 316, and a receiver 318 may be included in the refrigerant circuit in refrigerant line 306 as in conventional practice. The system 300 can also include a temperature sensor 397a for sensing the temperature of the air returning to the heat absorption heat exchanger from the container and a temperature sensor 397b for sensing a temperature of the air being supplied to the container. Sensors (not shown) may also be provided for monitoring additional conditions such as for example ambient outdoor air temperature and humidity.

The refrigeration unit also includes an electronic controller 390 to operate the refrigeration unit 310 to maintain a predetermined thermal environment within the enclosed volume, e.g., a box, wherein the product is stored. The electronic controller 390 can maintain the predetermined environment by selectively controlling the operation of the compressor 320, the fan(s) 334 associated with the heat rejection heat exchanger coil 332, the fan(s) 344 associated with the heat absorption heat exchanger coil 342, and the suction modulation valve 312. For example, when cooling of the environment within the box is required, the electronic controller 390 provides electrical power to activate the compressor 320, the fan 334 and the fan 344. Additionally, the electronic controller 390 adjusts the position of the suction modulation valve 312 to increase or decrease the flow of refrigerant supplied to the compressor 320 as appropriate to control and stabilize the temperature within the box at the set point temperature, which corresponds to the desired product storage temperature for the particular product stored within the box.

Embodiments of methods and transport refrigeration units according to the application can control defrost operations for high pressure refrigerant transport refrigeration systems. A defrost mode according to embodiments of the system 200, 300 can reduce or avoid a likelihood that refrigerant can be trapped inside the heat absorption heat exchanger 240, 340 (e.g., evaporator coil) during defrost mode operations. Further, the refrigerant that is not trapped in the heat absorption heat exchanger should not be allowed to flow into the compressor 212, 320 (e.g., compressor sump), which can then cause flooding. In one exemplary embodiment, the SMV 254, 312 or modulation valve on the inlet line to the compressor 212 should be completely closed, the primary side expansion valve 252, 350 (e.g., EVXV) should be maintained with a small opening or a minimum opening, and/or the auxiliary expansion valve 236 (e.g., high side pressure valve HPXV) should be substantially or completely open. For example, the auxiliary expansion valve 236 should be sufficiently open so as not to impede the balancing of refrigerant pressure between within the system 200 (except the compressor). For example, the auxiliary expansion valve 236 can be 40%, more than 50%, 80% or 95% open. Thus, refrigerant can flow within the majority of the unit 204, 310 internal volume except compressor.

Further, embodiments of methods and transport refrigeration units according to the application can monitor and compare the system 200 low side pressure with a predetermined pressure limit including before heaters 241,341 (e.g., operatively coupled to the heat absorption heat exchanger for defrost operations) can be energized. When the system 200 operations, a malfunction or error conditions cause the system 200 low side pressure already to be close to the predetermined pressure limit, then energizing the heaters in the defrost operation will make the refrigerant vapor compression system 200 low side pressure increase. When the heaters have been energized and the system pressure goes above the predetermined pressure limit, then embodiments according to the application can perform actions or control component operations to reduce the pressure (relative to defrost mode). In one embodiment, the controller 266 can energize the heat absorption heat exchanger fan 246 to remove heat and/or turn off the heater, which would interrupt the defrost operations. In the case where the heaters are turned off responsive to high pressure, the heat absorption heat exchanger or evaporator fans 246 can be turned on to attempt shedding water from the heat absorption heat exchanger 240. When defrost operations were interrupted, but before defrost mode is exited, a delta_T or temperature check can be performed to determine whether the defrost of the heat absorption heat exchanger 240 was partially or wholly effective. Such a delta_T or temperature check can also be performed for an uninterrupted defrost operation. Also, if it is determined that the system 200 low side pressure already exceeds the predetermined pressure limit before defrost mode is enabled, the entry into the defrost mode can be prevented or postponed.

As described herein, embodiments according of the application can reduce or prevent high pressures for the refrigerant being generated in the system 200, 300 and/or at the low pressure side of the unit 204, 310. When heaters are energized in the defrost mode, the refrigerant in the coil or finned tube heat exchanger 244 can be heated up to supercritical pressures, which can result in undesirable Pressure Relief Valve (PRV) relief. Embodiments can avoid operations where the heat exchanger 240 is heated with upstream and downstream refrigerant flow control devices being closed to trap refrigerant charge in a limited area of the unit 204 (e.g., 240). Further, operations can reduce or avoid pressure build up on a low pressure side, (e.g., the pressure within the evaporator coil), which can reach a dangerously high level in very short time when heaters are energized. Embodiments of the application can provide safe operation of high pressure refrigerants like CO2 refrigeration systems during defrost operations.

An embodiment of a method of operating a transport refrigeration system according to the application will now be described. The method embodiment shown in FIG. 4, can be implemented in and will be described using a transport refrigeration system embodiment shown in FIG. 2, however, the method embodiment is not intended to be limited thereby.

Figure 4:
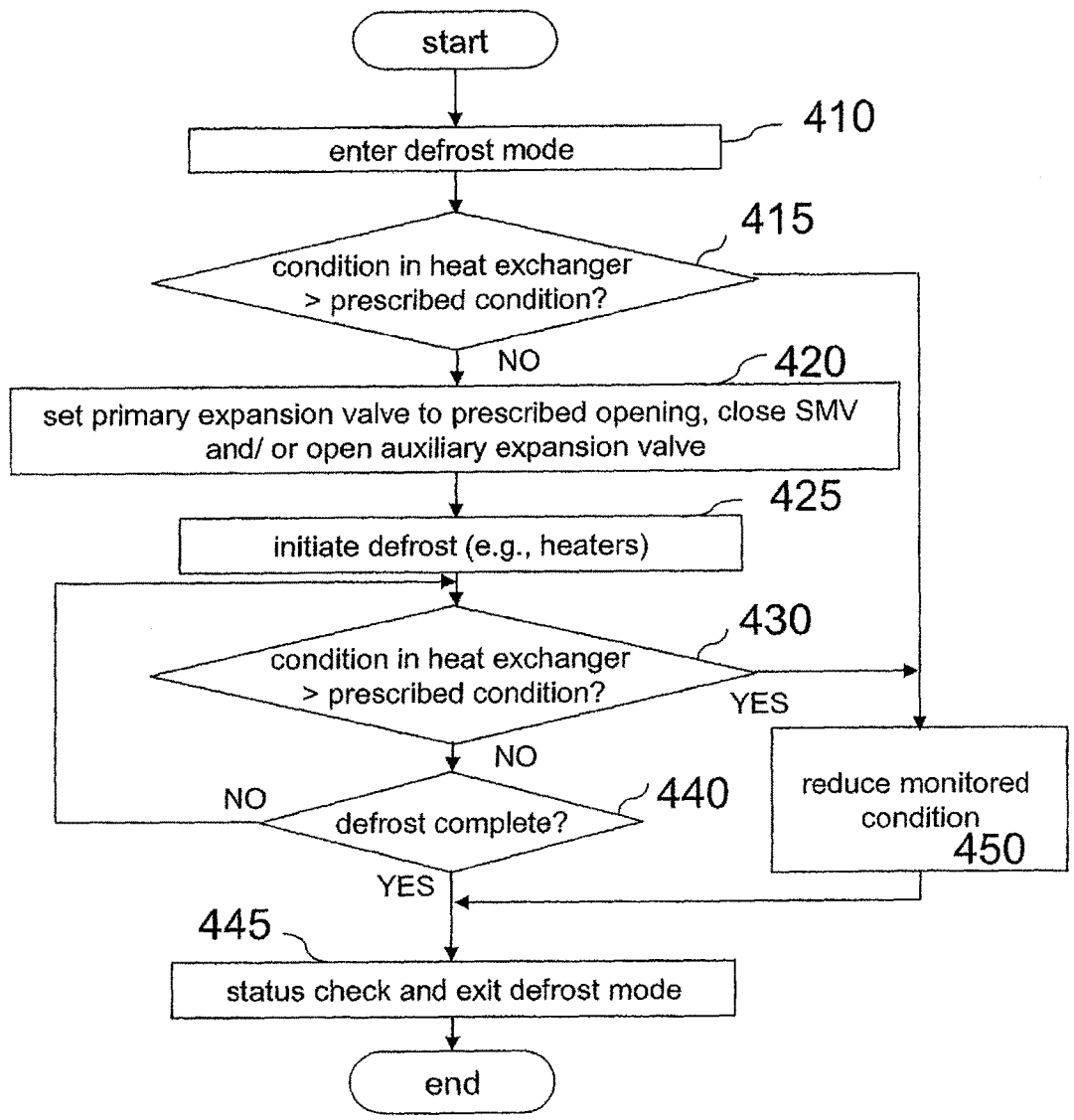
FIG. 4 is a flowchart that illustrates an embodiment of method of operating a transport refrigeration system according to the application.

Referring now to FIG. 4, a process can start when the defrost mode is entered. In one embodiment, the system 200 can operate in a first mode and transition to the defrost mode (operation block 410). Then, a condition or pressure level at the low pressure side of the unit 204 or inside the heat absorption heat exchanger 240 can be can be compared to a prescribed condition. For example, a pressure transducer 292 or a temperature sensor can be installed at the heat absorption heat exchanger outlet to compare a current pressure at the outlet to a prescribed pressure threshold (operation block 415). When the determination in operation block 415 is negative, the controller 266 can allow the refrigerant to flow within the unit 204 internal volume to equalize the refrigerant pressure though the transport refrigeration unit 204, except the compressor 212. For example, the controller 266 can close the SMV 254 or modulation valve on the inlet line to the compressor 212, set the primary expansion valve 252 (e.g., EVXV) to a small opening or a minimum opening, and/or substantially open the auxiliary expansion valve 236 (e.g., 50%, 75%) (operation block 420). The heaters corresponding to the heat absorption heat exchanger 240 can be enabled (operation block 425) for defrost operations. Then, conditions at the low pressure side of the unit 204 or inside the heat absorption heat exchanger 240 can be compared (e.g., again) to the prescribed condition (operation block 430). The prescribed condition in operation block 430 can be a prescribed pressure such as a threshold pressure, refrigerant critical point, a pressure limit less than relief valve pressure values for the refrigerant vapor compression system, a low side pressure threshold or the like.

When the determination in operation block 430 is negative, control jumps to operation block 440, where it can be determined whether the defrost operations are complete (e.g., a calculated defrost interval of time has elapsed). When the determination in operation block 440 is negative, control returns to operation block 430. When the determination in operation block 440 is affirmative, a status check of the heat absorption heat exchanger 240 can be performed (operation block 445). The status check can be a delta temperature drop test across the heat absorption heat exchanger 240. For example, if RAT-SAT is less than one degree Celsius, the defrost operation was completely performed.

When the determination in operation blocks 415 or 430 is affirmative, the unit 204 can take actions to reduce the monitored condition or pressure and/or exit defrost mode. In one embodiment, the controller 266 can energize the heat rejection heat exchanger fan 246 to remove heat and/or turn off the heaters (operation block 450). From operation block 445, the process can end.

Various advantages that embodiments of apparatus, transport refrigeration units, and methods for operating the same can include controlling defrost operations for a refrigerant vapor compression system. In more complex refrigeration vapor compression systems, such as those equipped with a multi-stage compression device and capacity modulation, embodiments can provide a number of refrigerant flow control devices to permit selective control of refrigerant flow through the various branches of the refrigerant circuit.

Exemplary system and method embodiments according to the application can be implemented using various configurations for a primary refrigerant loop or a plurality of coupled refrigerant loops, for example, in the transport refrigeration unit. In one embodiment, a bypass line and unloader service valve can be optional. In one embodiment, a liquid injection line and corresponding flow control device can be optional. In one embodiment, a vapor injection line and corresponding flow control device can be optional. In one embodiment, the economizer valve can be implemented using other flow control devices such as but not limited to an economizer expansion valve. In one embodiment, the vapor injection line can be configured to selectively input into the compressor mid stage and/or the compressor inlet port.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments variously described herein in FIG. 4 can be specifically interchanged or combined with features of FIG. 3 or FIG. 2.

We claim:

1. A method for operating a defrost mode of a transport refrigerant vapor compression system including a refrigerant circuit including, in a serial arrangement, a refrigerant compression device, a refrigerant heat rejection heat exchanger, a secondary expansion device, an economizer device, a primary expansion device, a refrigerant heat absorption heat exchanger and a suction modulation valve between the refrigerant heat absorption heat exchanger and a suction port of the refrigerant compression device, the method comprising:

closing the suction modulation valve and partially opening the primary expansion device and opening the secondary expansion device to an open position;

initiating a defrost operation for the transport refrigerant vapor compression system by energizing heaters operatively coupled to the heat absorption heat exchanger operable to defrost the heat absorption heat exchanger;

during the defrost operation, comparing a heat absorption heat exchanger pressure to a first predetermined limit, where the first predetermined limit is less than a pressure release valve prescribed pressure;

in response to the heat absorption heat exchanger pressure being less than the first predetermined limit, performing at least one operation to determine if the defrost operation should be exited; and in response to the heat absorption heat exchanger pressure being greater than the first predetermined limit, exiting the defrost operation.

2. The method of claim 1, wherein the at least one operation to determine if the defrost operation should be exited comprises passing of a prescribed time interval or determining that a monitored state of the heat absorption heat exchanger indicates defrost completion or detecting a malfunction.

3. The method of claim 2, wherein the detecting a malfunction comprises monitoring pressure at a location between the primary expansion device and the suction port of the refrigerant compression device.

4. The method of claim 2, wherein the detecting the malfunction comprises:
    comparing a condition of the heat absorption heat exchanger to a threshold condition; and
    interrupting the defrost operation when the condition of the heat absorption heat exchanger is above the threshold condition.

5. The method of claim 4, wherein the condition is a pressure of refrigerant in the refrigerant heat absorption heat exchanger, and wherein the threshold condition is a refrigerant pressure value less than the pressure release valve prescribed pressure.

6. The method of claim 4, wherein interrupting the defrost operation comprises:
    energizing a heat rejection heat exchanger fan to reduce temperature;
    disabling the heaters; and
    performing a defrost operation status check.

7. The method of claim 6, wherein the defrost operation status check comprises determining a temperature drop across the heat absorption heat exchanger, wherein the defrost operation status check is affirmative when the determined temperature drop across the heat absorption heat exchanger is less than a prescribed value and the defrost operation status check is negative when the determined temperature drop across the heat absorption heat exchanger is not less than the prescribed value.

8. The method of claim 7, wherein the determined temperature drop is return air temperature minus supply air temperature of the transport refrigerant vapor compression system.

9. A method for operating a defrost mode of a transport refrigerant vapor compression system including a refrigerant circuit including, in a serial arrangement, a refrigerant compression device, a refrigerant heat rejection heat exchanger, a secondary expansion device, an economizer device, a primary expansion device, a refrigerant heat absorption heat exchanger and a suction modulation valve between the refrigerant heat absorption heat exchanger and a suction port of the refrigerant compression device, the method comprising:
    entering a defrost mode;
    upon entering the defrost mode, comparing a heat absorption heat exchanger pressure to a first predetermined limit, where the first predetermined limit is less than a pressure release valve prescribed pressure, wherein when the heat absorption heat exchanger pressure is greater than the first predetermined limit reducing the heat absorption heat exchanger pressure and exiting the defrost mode;
    wherein when the heat absorption heat exchanger pressure is less than the first predetermined limit, closing the suction modulation valve and partially opening the primary expansion device and opening the secondary expansion device to an open position;
    after closing the suction modulation valve, initiating a defrost operation for the transport refrigerant vapor compression system by energizing heaters operatively coupled to the heat absorption heat exchanger operable to defrost the heat absorption heat exchanger;
    during the defrost operation, comparing the heat absorption heat exchanger pressure to the first predetermined limit;
    during the defrost operation, in response to the heat absorption heat exchanger pressure being less than the first predetermined limit, performing at least one operation to determine if the defrost operation should be exited; and
    during the defrost operation, in response to the heat absorption heat exchanger pressure being greater than the first predetermined limit, reducing the heat absorption heat exchanger pressure and exiting the defrost mode.

* * * * *